(12) United States Patent
Fernandez

(10) Patent No.: US 9,732,870 B2
(45) Date of Patent: Aug. 15, 2017

(54) SYSTEM AND METHOD FOR SAFER VENTING OF HYDROGEN OR OTHER COMBUSTIBLE GASES

(71) Applicant: Cameron Solutions, Inc., Houston, TX (US)

(72) Inventor: Luis Eduardo Caires Fernandez, Cypress, TX (US)

(73) Assignee: Cameron Solutions, Inc., Houston, TX (US)

( * ) Notice: Subject to any disclaimer, the term of this patent is extended or adjusted under 35 U.S.C. 154(b) by 105 days.

(21) Appl. No.: 14/515,210

(22) Filed: Oct. 15, 2014

(65) Prior Publication Data

US 2016/0109032 A1    Apr. 21, 2016

(51) Int. Cl.
*F16K 24/04*    (2006.01)
*F23N 5/02*    (2006.01)
(Continued)

(52) U.S. Cl.
CPC .............. *F16K 24/04* (2013.01); *F23N 5/022* (2013.01); *F23N 5/18* (2013.01); *F23N 5/242* (2013.01); *F23N 2023/08* (2013.01)

(58) Field of Classification Search
CPC .......... F16K 24/04; F23N 5/022; F23N 5/242; F23N 5/18; F23N 2023/08; Y10T 137/0324; Y10T 137/0329; Y10T 137/0363; Y10T 137/2509; Y10T 137/2572; Y10T 137/2647; Y10T 137/469; Y10T 137/86324; Y10T 137/8634; A62C 99/0018; B63B 57/04; E21B 21/067; E21B 43/34; E21B 41/005; E21B 21/063
(Continued)

(56) References Cited

U.S. PATENT DOCUMENTS 2,507,380 A * 5/1950 Morrison ................ F25B 45/00
                                                  220/88.3
3,850,001 A * 11/1974 Locke ...................... A62C 3/06
                                                  114/74 A
(Continued)

FOREIGN PATENT DOCUMENTS

GB          982791          2/1965
WO        2005063562        7/2005
(Continued)

*Primary Examiner* — Michael R Reid
(74) *Attorney, Agent, or Firm* — Gable Gotwals

(57) ABSTRACT

A system and process for intermittently venting combustible gas (c-gas) from a continuous source to the atmosphere are presented. The system includes a primary c-gas storage tank, at least one primary admission valve located upstream of the primary c-gas storage tank for regulating the flow of c-gas from the continuous source to the storage tank, a primary valve for atmospheric venting located downstream of the primary c-gas storage tank, and a primary PIC that opens the primary valve for atmospheric venting when pressure in the primary c-gas storage tank reaches a pre-determined PIC vent point. The system may include an auxiliary system to receive and vent c-gas while the primary admission valve is closed. The primary and auxiliary systems may also include an inert gas storage tank and inert gas valve for diluting the c-gas before it is vented to the atmosphere.

9 Claims, 2 Drawing Sheets

(51) Int. Cl.
*F23N 5/18* (2006.01)
*F23N 5/24* (2006.01)

(58) Field of Classification Search
USPC .......... 166/356; 169/11, 69; 137/2, 3, 9, 93,
137/114, 115.28, 256, 587, 589, 263;
141/2, 4, 44, 49, 54, 57, 59, 104;
220/202, 203.01, 203.27, 203.29, 88.3
See application file for complete search history.

(56) References Cited

U.S. PATENT DOCUMENTS

| | | | | |
|---|---|---|---|---|
| 5,829,964 | A * | 11/1998 | Derrick | F23L 7/00 |
| | | | | 431/202 |
| 6,341,572 | B1 * | 1/2002 | Howell | A62C 99/0018 |
| | | | | 114/230.12 |
| 6,604,558 | B2 * | 8/2003 | Sauer | A62C 3/06 |
| | | | | 141/44 |

FOREIGN PATENT DOCUMENTS

| | | |
|---|---|---|
| WO | 2014083312 | 6/2014 |
| WO | 2014128132 | 8/2014 |

* cited by examiner

SYSTEM AND METHOD FOR SAFER VENTING OF HYDROGEN OR OTHER COMBUSTIBLE GASES

BACKGROUND

This disclosure relates to systems and methods for safer venting of hydrogen and other combustible gases from continuous sources. More particularly, the disclosure relates to systems and methods for the intermittent venting of hydrocarbon and other combustible gases from oil production processes that continuously produce such gases.

In the oil production environment, some of the applicable technologies, including but not limited to electro-chlorinators and hydrogen generators, may require venting in order to dispose of hydrogen or other combustible gases (c-gas). However, in certain locations, it may be unacceptable to continuously vent undiluted c-gas to the atmosphere due to safety concerns such as explosion or worker exposure. Continuous venting of c-gas may also be unacceptable due to ambient air quality standards or other environmental limitations. In particular, continuous venting of c-gas may not be possible on off-shore production platforms.

One present approach for managing c-gas is to route the c-gas to the facility's flare system. However, this requires piping modifications to route the c-gas to the flare system, increasing construction and operational costs. In addition, routing c-gas to the flare may negatively impact the operation of the flare and may only transfer environmental and safety concerns from one location to another. For example, increasing emissions from the flare may not be allowable under the applicable permit or air quality rules.

Another present approach is to intermittently vent the c-gas to the atmosphere, where it is diluted with air and dispersed. However, environmental considerations may prevent intermittent venting in some locations. In addition, intermittent venting may create a zone close to the vent point where the concentration of c-gas is within the explosive range (between the lower and upper explosive limits), creating a safety risk to employees and process equipment. Another approach is to dilute the vented c-gas with air from a blower or fan, thereby ensuring quick mixing and forced dispersion into the atmosphere. However, depending on the characteristics of the c-gas and the location of the equipment, dilution with air may not alleviate the safety and environmental concerns. In addition, the blower or fan increases the cost of operating the system and requires periodic inspection, maintenance, and repair. Finally, the entire system may have to be shut down when the fan or blower is inoperable.

There is a need for systems and processes that can dispose of hydrogen or other c-gas by venting to the atmosphere in a way that is both safe and acceptable for a specified location. There is also a need for systems and processes that allow intermittent venting of c-gas when the source continuously produces the c-gas. There is also a need for systems and processes that avoid the explosive range of the c-gas, thereby rendering the c-gas non-explosive as it is vented and dispersed into the atmosphere.

SUMMARY

Embodiments of a system for intermittently venting combustible gas (c-gas) from a continuous source to the atmosphere includes a primary c-gas storage tank, at least one primary admission valve located upstream of the primary c-gas storage tank for regulating the flow of c-gas from the continuous source to the storage tank, a primary valve for atmospheric venting located downstream of the primary c-gas storage tank for regulating the flow of c-gas from the primary c-gas storage tank to the atmosphere, and a pressure indicating controller (PIC) that opens the primary valve for atmospheric venting when pressure in the primary c-gas storage tank reaches a pre-determined PIC vent set point. The system may include an auxiliary system to receive and vent c-gas if the source cannot continue to operate while the primary admission valve is closed and c-gas is vented from the primary c-gas storage tank. The primary and auxiliary systems may also include an inert gas storage tank and inert gas valve for diluting the c-gas before it is vented to the atmosphere, thereby avoiding the issue of flammability.

A process for intermittently venting c-gas from a continuous source to the atmosphere includes (i) opening at least one primary admission valve to allow the c-gas to flow from the continuous source into the primary c-gas storage tank and (ii) opening the primary valve for atmospheric venting when pressure in the primary c-gas storage tank reaches a pre-determined PIC vent set point, thereby releasing c-gas into the atmosphere. The process may include transferring the flow of c-gas between the primary and auxiliary c-gas storage tanks, venting c-gas from the auxiliary c-gas storage tank, and diluting the c-gas before it is released to the atmosphere.

BRIEF DESCRIPTION OF THE DRAWINGS

So that manner in which the above recited features can be understood in detail, a more particular description may be had by reference to embodiments, some of which are illustrated in the appended drawings, wherein like references numerals denote like elements. It is to be noted, however, that the appended drawings illustrate various embodiments and are therefore not to be considered limiting of its scope, and may admit to other equally effective embodiments.

ELEMENTS AND NUMBERING USED IN THE DRAWINGS

Figure 1:
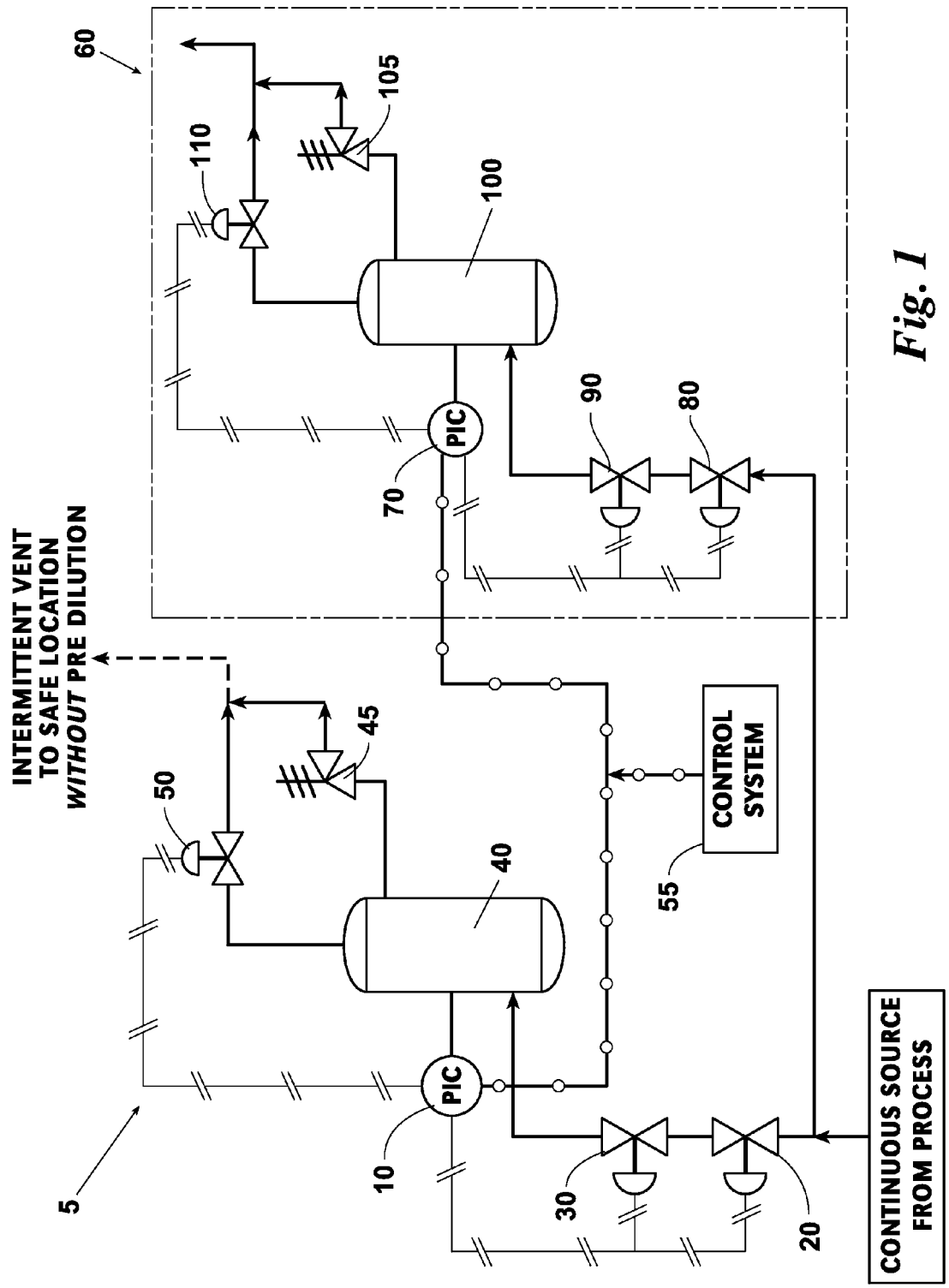
FIG. 1 is a schematic of an embodiment of a system for venting c-gas intermittently from a continuous source to the atmosphere. The system includes an auxiliary system that is used when the source cannot operate when the admission valves on the primary system are closed.

5 Primary system
10 Primary PIC
20 Primary first admission valve
30 Primary second admission valve
40 Primary c-gas storage tank
45 Pressure relief valve
50 Primary valve for atmospheric venting
55 Control system
60 Auxiliary system
70 Auxiliary PIC
80 Auxiliary first admission valve
90 Auxiliary second admission valve
100 Auxiliary c-gas storage tank
105 Pressure relief valve 110 Auxiliary valve for atmospheric venting
120 Primary inert gas storage tank
130 Primary inert gas valve
140 Auxiliary inert gas storage tank
150 Auxiliary inert gas valve

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

Embodiments of a system and process for venting hydrogen or other c-gas from continuous sources to the atmosphere are described. The systems and processes allow for the intermittent venting of c-gas when the source continuously produces the gas and provide auxiliary systems, as needed, to ensure that the source can remain operational. The systems and processes also allow for the c-gas to be mixed with an inert gas before it is vented to the atmosphere, thereby avoiding the explosive range of the gas and minimizing the risk of explosion.

Referring to FIG. 1, the primary system 5 for intermittent venting of c-gas from a continuous source is comprised of a primary c-gas storage tank 40 with pressure relief valve 45, a primary first admission valve 20 located upstream of the primary second admission valve 30 and the primary c-gas storage tank 40, a primary second admission valve 30 located between the primary first admission valve 20 and the primary c-gas storage tank 40, a primary valve for atmospheric venting 50 located downstream of the primary c-gas storage tank 40, a primary PIC 10 that controls the opening and closing of each valve, and associated piping. This system may be particularly useful in locations where there are no safety or environmental concerns associated with the intermittent venting of c-gas to the atmosphere.

When the admit process gas pressure set point is reached in the primary system 5, the primary PIC 10 opens the primary first admission valve 20 and the primary second admission valve 30, which allows c-gas from the continuous source to flow into the primary c-gas storage tank 40. The admit process gas pressure set point is lower than the pressure of the continuous source in order for the c-gas to flow from the source into the primary c-gas storage tank 40. As the difference between the admit process gas pressure set point and the source pressure increases, the amount of time that c-gas can be loaded into the primary c-gas storage tank increases and the venting frequency decreases. Specific pressure ranges for the admit process gas pressure set point are determined based on the characteristics of the primary system 5 and the continuous source. Although the primary first admission valve 20 and the primary second admission valve 30 function as one unit, having two separate valves ensures that the c-gas source has been positively isolated from the primary system 5.

The c-gas continues to flow into the primary c-gas storage tank 40 until the primary PIC 10 detects that the PIC vent set point inside the primary c-gas storage tank 40 has been reached. The PIC vent set point may be selected based on multiple factors, including the design pressure of the primary c-gas storage tank 40 and the pressure of the continuous source. Higher PIC vent set points increase the amount of c-gas that can be stored in the primary c-gas storage tank 40 and decrease the venting frequency. Once the PIC vent set point has been reached, the primary PIC 10 closes the primary first and second admission valves 20, 30 and opens the primary valve for atmospheric venting 50, releasing the c-gas to the atmosphere. If the source can continue to operate while the primary first and second admission valves are closed and the c-gas vents to the atmosphere, the primary PIC 10 will detect when the admit process gas pressure set point is reached and react by closing the primary valve for atmospheric venting 50 and opening the primary first and second admission valves 20, 30 to admit c-gas from the source to the primary c-gas storage tank 40. The cycle is then repeated.

Alternatively, if the source cannot continue to operate while the primary first and second admission valves are closed and the gas vents to the atmosphere, the flow of c-gas is transferred to an auxiliary system 60 by control system 55. The control system 55 regulates the primary PIC 10 and the auxiliary PIC 70 so that there is a storage tank available to receive the flow of c-gas from the continuous source. The auxiliary system 60 is comprised of an auxiliary c-gas storage tank 100 with pressure relief valve 105, an auxiliary first admission valve 80 located upstream of the auxiliary second admission valve 90 and the auxiliary c-gas storage tank 100, an auxiliary second admission valve 90 located between the auxiliary first admission valve 80 and the auxiliary c-gas storage tank 100, an auxiliary valve for atmospheric venting 110 located downstream of the auxiliary c-gas storage tank 100, an auxiliary PIC 70 that controls the opening and closing of each auxiliary valve, and associated piping.

In this embodiment, the auxiliary PIC opens the auxiliary first admission valve 80 and the auxiliary second admission valve 90 as the primary first admission valve 20 and the primary second admission valve 30 are closed. Although the auxiliary first admission valve 80 and the auxiliary second admission valve 30 function as one unit, having two separate valves ensures that the c-gas source has been positively isolated from the auxiliary system 60.

C-gas from the continuous source then fills the auxiliary c-gas storage tank 100 until the auxiliary PIC 70 detects that the PIC vent set point inside the auxiliary c-gas storage tank 100 has been reached. The PIC vent set point for the auxiliary system may or may not be equal to the PIC vent set point for the primary system. The auxiliary PIC 70 then opens the auxiliary valve for atmospheric venting 110, which allows the c-gas inside the auxiliary c-gas storage tank 100 to vent to the atmosphere. At the same time, the control system 55 directs the auxiliary PIC 70 to close the auxiliary first admission valve 80 and the auxiliary second admission valve 90 and directs the primary PIC 10 to open the primary first admission valve 20 and the primary second admission valve 30, thereby returning the flow of c-gas to the primary system 5. The entire cycle is then repeated as necessary.

Figure 2:
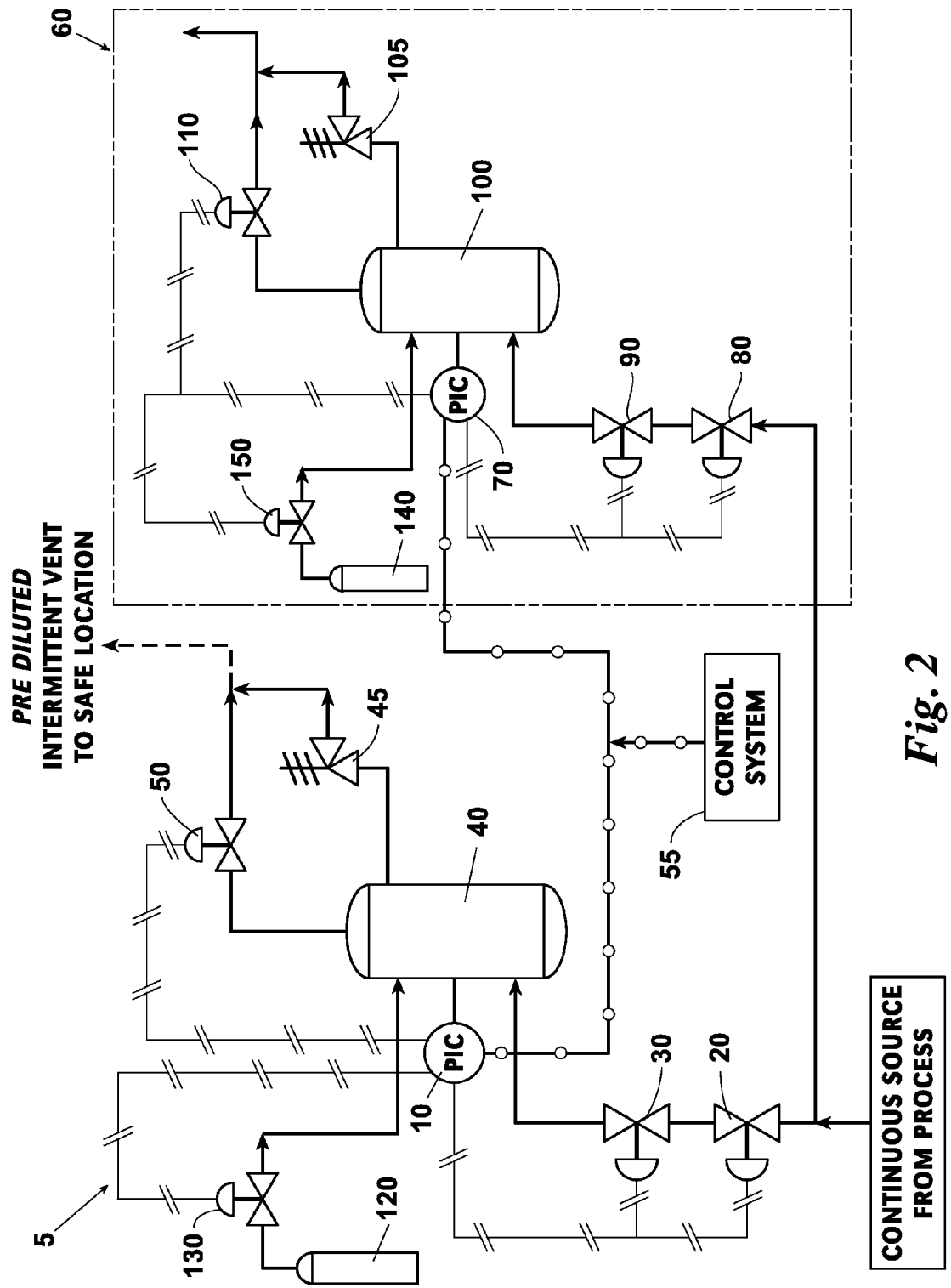
FIG. 2 is a schematic of an embodiment of a system for venting c-gas from a continuous source to the atmosphere. This embodiment includes a system for diluting c-gas with inert gas before it is vented to the atmosphere. The system also includes an auxiliary system that is used when the source cannot operate when the admission valves on the primary system are closed.

FIG. 2 depicts an embodiment in which the hydrogen or other c-gas is diluted with an inert gas so that its concentration is below the lower explosive level before it is vented to the atmosphere. As a result, the risk of explosion after the gas is vented to the atmosphere is minimized.

The primary system 5 for intermittent venting of c-gas from a continuous source after it has been diluted with an inert gas is comprised of a primary c-gas storage tank 40 with pressure relief valve 45, a primary first admission valve 20 located upstream of the primary second admission valve 30 and the primary c-gas storage tank 40, a primary second admission valve 30 located between the primary first admission valve 20 and the primary c-gas storage tank 40, a primary valve for atmospheric venting 50 located downstream of the primary c-gas storage tank 40, a primary PIC 10 that controls the opening and closing of each valve, and associated piping. The primary system 5 also includes a primary inert gas storage tank 120, a primary inert gas valve 130 that is located between the primary inert gas storage tank 120 and the primary c-gas storage tank 40 and that is regulated by the primary PIC 10, and associated piping. Alternatively, the inert gas could be provided by any other reliable source as long as the supply of inert gas to the primary c-gas storage tank 40 is regulated by a valve or other means. Potential inert gases that may be used in the primary system 5 include, but are not limited to, nitrogen, carbon dioxide, and helium.

When the admit process gas pressure set point is reached in the primary system, the primary PIC 10 opens the primary first admission valve 20 and the primary second admission valve 30, which allows c-gas from the continuous source to flow into the primary c-gas storage tank 40. The admit process gas pressure set point is lower than the pressure of the continuous source in order for the c-gas to flow from the source into the primary c-gas storage tank 40. As the difference between the admit process gas pressure set point and the source pressure increases, the amount of time that c-gas can be loaded into the primary c-gas storage tank increases and the venting frequency decreases. Specific pressure ranges for the admit process gas pressure set point are determined based on the characteristics of the primary system 5 and the continuous source. Although the primary first admission valve 20 and the primary second admission valve 30 function as one unit, having two separate valves ensures that the c-gas source has been positively isolated from the primary system 5.

The c-gas continues to flow into the primary c-gas storage tank 40 until the primary PIC 10 detects that the PIC inert gas admit set point has been reached. The PIC inert gas admit set point is different for each combination of c-gas and inert gas, and can be determined through process simulation. The primary PIC 10 then closes the primary first admission valve 20 and the primary second admission valve 30 and opens the primary inert gas valve 130, which allows inert gas to flow from the primary inert gas storage tank 120 into the primary c-gas storage tank 40 and mix with the c-gas.

The flow of inert gas continues until the primary PIC 10 detects that the PIC vent set point inside the primary c-gas storage tank 40 has been reached. Like the PIC inert gas admit set point, the PIC vent set point is different from each combination of c-gas and inert gas, and can be determined through process simulation. Higher PIC vent set points increase the amount of c-gas that can be stored in the primary c-gas storage tank 40 and decrease the venting frequency. The primary PIC 10 then closes the primary inert gas valve 130 and opens the primary valve for atmospheric venting 50, releasing the diluted c-gas to the atmosphere. If the source can continue to operate during the inert gas admission and venting phases of the cycle while the primary first and second admission valves are closed, the primary PIC 10 will detect when the admit process gas pressure set point is reached and react by closing the primary valve for atmospheric venting 50 and opening the primary first and second admission valves 20, 30 to admit c-gas from the source. The cycle is then repeated.

Alternatively, if the source cannot continue to operate while the primary first and second admission valve are closed and the gas vents to the atmosphere, the flow of c-gas is transferred to an auxiliary system 60 by a control system 55, which regulates the primary PIC 10 and the auxiliary PIC 70 so that there is a storage tank available to receive the flow of c-gas from the continuous source. The auxiliary system 60 is comprised of an auxiliary c-gas storage tank 100 with pressure relief valve 105, an auxiliary first admission valve 80 located upstream of the auxiliary second admission valve 90 and the auxiliary c-gas storage tank 100, an auxiliary second admission valve 90 located between the auxiliary first admission valve 80 and the auxiliary c-gas storage tank 100, an auxiliary valve for atmospheric venting 110 located downstream of the auxiliary c-gas storage tank 100, an auxiliary PIC 70 that controls the opening and closing of each auxiliary valve, and associated piping.

The auxiliary system 60 also includes an auxiliary inert gas storage tank 140, an auxiliary inert gas valve 150 that is located between the auxiliary inert gas storage tank 140 and the auxiliary c-gas storage tank 100 and that is regulated by the auxiliary PIC 70, and associated piping. Alternatively, the inert gas could be provided by any other reliable source as long as the supply of inert gas to the auxiliary c-gas storage tank 100 is regulated by a valve or other means. Potential inert gases that may be used in the auxiliary system 60 include, but are not limited to, nitrogen, carbon dioxide, and helium.

In this embodiment, the auxiliary PIC opens the auxiliary first admission valve 80 and the auxiliary second admission valve 90 as the primary first admission valve 20 and the primary second admission valve 30 are closed. Although the auxiliary first admission valve 80 and the auxiliary second admission valve 90 function as one unit, having two separate valves ensures that the c-gas source has been positively isolated from the auxiliary system 60. C-gas from the continuous source then fills the auxiliary c-gas storage tank 100 until the auxiliary PIC 70 detects that the PIC inert gas admit set point inside the auxiliary c-gas storage tank 100 has been reached. The PIC inert gas admit set point is different for each combination of c-gas and inert gas, and can be determined through process simulation. The auxiliary PIC 70 then closes the auxiliary first admission valve 80 and the auxiliary second admission valve 90 and opens the auxiliary inert gas valve 150, which allows inert gas to flow from the auxiliary inert gas storage tank 140 into the auxiliary c-gas storage tank 100 and mix with the c-gas.

The mixing of c-gas and inert gas continues until the auxiliary PIC 70 detects that the PIC vent set point inside the auxiliary c-gas storage tank 100 has been reached. The PIC vent set point for the auxiliary system may or may not be equal to the PIC vent set point for the primary system. The auxiliary PIC 70 then closes the auxiliary inert gas valve 150 and opens the auxiliary valve for atmospheric venting 110, which allows the diluted c-gas inside the auxiliary c-gas storage tank 100 to vent to the atmosphere. At the same time, the control system 55 directs the auxiliary PIC 70 to close the auxiliary first admission valve 80 and the auxiliary second admission valve 90 and directs the primary PIC 10 to open the primary first admission valve 20 and the primary second admission valve 30, thereby returning the flow of c-gas to the primary system 5. The entire cycle is then repeated as necessary.

While embodiments have been described with a certain degree of particularity, many changes may be made in the details of construction, the arrangement of components, and the process without departing from the spirit and scope of this disclosure. Further, multiple systems may be operated in parallel. Further, while the invention has been described in the context of oil production processes, it is equally applicable to other continuous sources of hydrogen or other c-gas or to other gases that may need to be diluted to reach a safe composition, temperature, or other variable before venting.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

What is claimed:

1. A process for intermittently venting c-gas from a continuous source to the atmosphere, the process comprising the steps of:
    opening at least one primary admission valve to allow c-gas to flow from the continuous source into a primary c-gas storage tank;
    diluting the c-gas within the c-gas storage tank below a flammable level with an inert gas; and
    opening a primary valve for atmospheric venting when pressure in the primary c-gas storage tank reaches a pre-determined PIC vent set point, thereby releasing the diluted c-gas into the atmosphere.

2. A process according to claim 1, further comprising the steps of closing the primary valve for atmospheric venting and opening the primary admission valve when pressure from the primary c-gas storage tank reaches a pre-determined admit process gas pressure set point.

3. A process according to claim 1, further comprising the step of transferring flow of c-gas between the primary c-gas storage tank and an auxiliary c-gas storage tank.

4. A process according to claim 3, further comprising the step of releasing c-gas from the auxiliary c-gas storage tank by opening an auxiliary valve for atmospheric venting when pressure in the auxiliary c-gas storage tank reaches a pre-determined PIC vent set point.

5. A process according to claim 3, further comprising the step of diluting the c-gas in the auxiliary c-gas storage tank with inert gas before the c-gas is vented to the atmosphere.

6. A process for intermittently inertizing and venting c-gas from a continuous source to the atmosphere, the process comprising:
    opening at least one admission valve to allow c-gas to flow from the continuous source into a c-gas storage tank;
    diluting the c-gas within the c-gas storage tank so that its concentration is below a flammable level; and
    venting the inertized c-gas to atmosphere when pressure in the c-gas storage tank reaches a pre-determined vent set point.

7. A process according to claim 6, further comprising:
    closing a valve for atmospheric venting; and
    opening the admission valve when pressure from the primary c-gas storage tank reaches a pre-determined admit process gas pressure set point.

8. A process according to claim 6, further comprising the step of transferring flow of the c-gas between the c-gas storage tank and an auxiliary c-gas storage tank.

9. A process according to claim 8, further comprising;
    diluting the c-gas in the auxiliary c-gas storage tank so that its concentration is below a flammable level; and
    venting the inertized c-gas in the auxiliary c-gas storage tank to atmosphere when pressure in the auxiliary c-gas storage tank reaches a pre-determined vent set point.

* * * * *